(12) United States Patent
Menzl et al.

(10) Patent No.: US 12,374,735 B2
(45) Date of Patent: Jul. 29, 2025

(54) TEMPERATURE CONTROL APPARATUS

(71) Applicant: Kreisel Electric GmbH & Co. KG, Rainbach im Mühlkreis (AT)

(72) Inventors: Kilian Menzl, Linz (AT); Peter Dobusch, Grünbach (AT); Gerhard Waldschütz, Freistadt (AT)

(73) Assignee: John Deere Electric Powertrain LLC, Moline, IL (US)

( * ) Notice: Subject to any disclaimer, the term of this patent is extended or adjusted under 35 U.S.C. 154(b) by 673 days.

(21) Appl. No.: 17/639,146

(22) PCT Filed: Aug. 10, 2020

(86) PCT No.: PCT/AT2020/060296
§ 371 (c)(1),
(2) Date: Feb. 28, 2022

(87) PCT Pub. No.: WO2021/035262
PCT Pub. Date: Mar. 4, 2021

(65) Prior Publication Data
US 2022/0320621 A1 Oct. 6, 2022

(30) Foreign Application Priority Data
Aug. 28, 2019 (AT) .................. A50744/2019

(51) Int. Cl.
*H01M 10/617* (2014.01)
*H01M 10/643* (2014.01)
(Continued)

(52) U.S. Cl.
CPC ....... *H01M 10/617* (2015.04); *H01M 10/651* (2015.04); *H01M 10/6557* (2015.04);
(Continued)

(58) Field of Classification Search
None
See application file for complete search history.

(56) References Cited

U.S. PATENT DOCUMENTS 10,483,606 B2 11/2019 Kreisel et al.
2002/0051340 A1 5/2002 Oda et al.
(Continued)

FOREIGN PATENT DOCUMENTS

DE 10201502013377 A1 4/2017
EP 3249740 * 11/2017
(Continued)

OTHER PUBLICATIONS

Machine translation of JP 2000133225, May 2000.*
(Continued)

*Primary Examiner* — Jonathan Crepeau
(74) *Attorney, Agent, or Firm* — Tiajoloff & Kelly LLP

(57) ABSTRACT

A temperature-control apparatus has individual battery cells combined to form a module and arranged within a flow duct through which a temperature-control fluid flows in a main flow direction. Temperature regulation of a temperature-control apparatus is improved with a constant packing density of the battery cells despite small amounts of temperature-control fluid, with a flow guiding surface provided for each battery cell of a group. The flow guiding surface is spaced apart from a lateral section of the battery cell and has in each case an inlet section and an outlet section that are both substantially parallel to the lateral section. A diffuser section is arranged between the inlet section and the outlet section, the diffuser section-being set back with respect to the inlet section and the outlet section and with respect to the lateral section.

21 Claims, 3 Drawing Sheets

Figure 1:
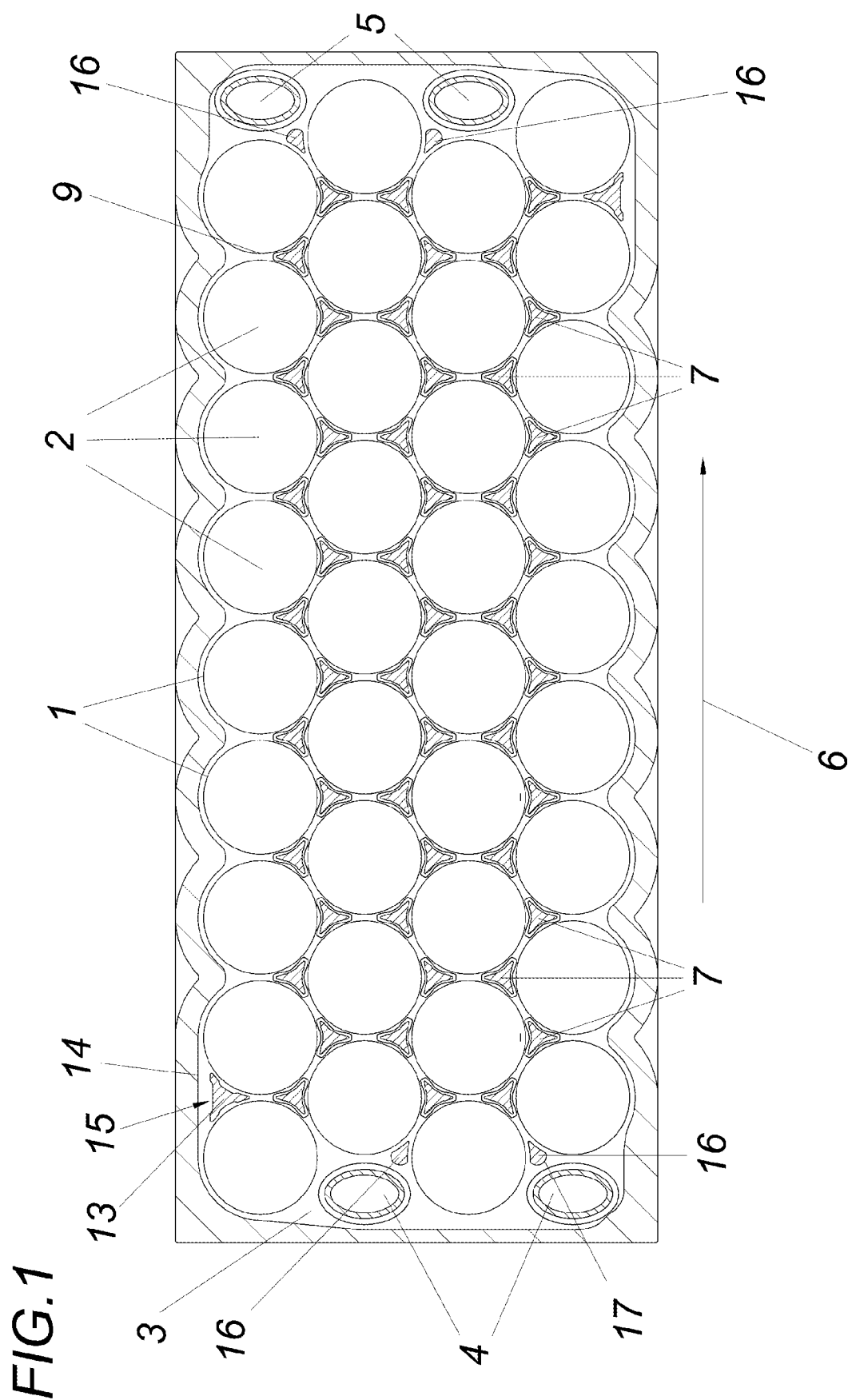

(51) Int. Cl.
*H01M 10/651* (2014.01)
*H01M 10/6557* (2014.01)
*H01M 10/6566* (2014.01)
*H01M 10/6568* (2014.01)
*H01M 50/213* (2021.01)
*H01M 50/289* (2021.01)

(52) U.S. Cl.
CPC .................. *H01M 10/6566* (2015.04); *H01M 10/6568* (2015.04); *H01M 50/213* (2021.01); *H01M 50/289* (2021.01); *H01M 10/643* (2015.04)

(56) References Cited

U.S. PATENT DOCUMENTS

| | | |
|---|---|---|
| 2009/0191452 A1 | 7/2009 | Anantharaman et al. |
| 2011/0151304 A1 | 6/2011 | Joswig et al. |
| 2013/0149583 A1 | 6/2013 | Kurita |
| 2018/0316074 A1 | 11/2018 | Kreisel et al. |

FOREIGN PATENT DOCUMENTS

| | | | |
|---|---|---|---|
| JP | 2000133225 A | | 5/2000 |
| JP | 2000223099 | * | 8/2000 |
| JP | 20010159789 A | | 6/2001 |
| JP | 2002157984 A | | 5/2002 |
| JP | 2005038678 A | | 2/2005 |
| JP | 2005353326 A | | 12/2005 |
| WO | 2019024616 A1 | | 2/2019 |

OTHER PUBLICATIONS

English-language Abstract for JP 2005038678, Feb. 10, 2005.
English-language Abstract for JP 2002157984, May 31, 2000.
English-language Abstract for JP 2000133225, May 12, 2000.
English-language Abstract for JP 20010159789, Jun. 8, 2001.
English-language Abstract for JP 2005353326, Dec. 22, 2005.

* cited by examiner

TEMPERATURE CONTROL APPARATUS

FIELD OF THE INVENTION

The invention relates to a temperature-control apparatus having individual battery cells which are combined to form a module and are arranged within a flow duct through which a temperature-control fluid flows in a main flow direction.

DESCRIPTION OF THE PRIOR ART

Temperature-control apparatuses for battery modules of various designs are known from the prior art, in which individual battery cells are arranged within a flow duct (DE102015013377A1). A temperature-control fluid flows through the flow duct in a main flow direction from a group of first fluid connections to a group of second fluid connections. However, a disadvantage of this, particularly in the case of cylindrical battery cells, is that different flow velocities form between the battery cells in the flow duct, so that uniform heat exchange between the battery cells and the temperature-control fluid is impeded. This problem is exacerbated if the battery cells are packed particularly densely, because even small dead volumes are then sufficient to make efficient flow around the battery cells and thus highly dynamic temperature regulation with simultaneously small amounts of temperature-control fluid impossible. However, especially during power peaks, both during charging and discharging, it is important for a long service life of the battery cells to operate them in a low temperature range and to allow only small temperature spreads within a battery module.

SUMMARY OF THE INVENTION

The invention is thus based on the object of improving the temperature regulation of a temperature-control apparatus while maintaining the packing density of the battery cells despite small amounts of temperature-control fluid.

The invention solves the problem in that for each battery cell of a group, a flow guiding surface is provided which is spaced from a lateral section of the battery cell and which has one inlet and outlet section each which are substantially parallel to the lateral section, and in that a diffuser section which is set back from the inlet and outlet sections and from the lateral section is arranged between the inlet and outlet sections. The invention is based on the realization that, in the case of flow around the battery cells known from the prior art, only a selective and short-term cooling effect occurs without a complete heat exchange being able to take place between the temperature-control fluid and the battery cells. According to the invention, therefore, a guide duct for the temperature-control fluid is formed between a flow guiding surface spaced from the battery cell and at least one lateral section of the battery cell, in that the flow around the battery cell jacket is uniform and prolonged, wherein the diffuser section ensures that no stagnation point is created for the temperature-control fluid and the pressure loss along the channel is minimized. On the other hand, if suitably arranged, the flow guiding surfaces reduce the dead volumes in the flow duct, so that more dynamic temperature regulation is possible. In a particularly preferred embodiment, the temperature fluid flows directly against the battery cell jacket. This means that the battery cell jacket and the flow guiding surface are in direct contact with the temperature-control fluid.

Flow simulations have shown that particularly efficient cooling can be achieved if the distance between the lateral section and diffuser section is 5 to 30% greater than the distance between the lateral section and inlet or outlet section. In particular, a sufficient reduction of a stagnation point and an associated pressure loss can be achieved if the distance between the lateral section and the diffuser section is 5 to 15% greater than the distance between the lateral section and the inlet or outlet section. Furthermore, it has been shown that the spacing ratios within a flow duct may also differ from each other. Thus, it is proposed that the ratio between the distance between the lateral section and the diffuser section and the distance between the lateral section and the inlet or outlet section is larger in the peripheral regions of the flow duct than in the center thereof. Especially when cylindrical battery cells are used, the distance between the lateral section and the diffuser section may be in a range of 1.25 mm and 2.25 mm, preferably at 1.75 mm, while the distance between the lateral section and the inlet or outlet section may be in a range of 1 mm to 2 mm, preferably at 1.6 mm.

In order to ensure not only a division of the fluid flow but also a uniform incident flow to the battery cells with the simplest possible design measures, it is proposed that the flow guiding surfaces of adjacent battery cells form a flow divider. This means that the flow divider occupies the intermediate space between the adjacent battery cells with the exception of the guide ducts arising between the flow guiding surfaces and the battery cells, so that the otherwise existing dead volume can be reduced. Particularly in the case of cylindrical battery cells, an arrangement of the individual battery cells in the form of a tightest circular pack thus results in flow dividers with an approximately star-shaped cross-section with three points.

Tests have shown that the venting behavior of the flow duct can be improved by a group of flow dividers forming a further flow guiding surface that extends essentially parallel to the inner wall of the flow duct. Here, in addition to the effects of the flow divider already described, the amount of air initially present in the flow duct is reduced and discharged more efficiently during venting. Venting can be further improved if the distance between the further flow guiding surface and the inner wall is greater than the distance between the inlet or outlet sections of the other flow guiding surfaces and the lateral section of the respective adjacent battery cell.

In order to ensure that the cooling fluid can be introduced into the guide ducts with a homogeneous flow velocity over the entire flow duct cross-section, it is proposed that the flow duct has at least two fluid connections on each of two edge sections opposite one another in the main flow direction, with at least one battery cell being arranged between the at least two fluid connections of an edge section. This arrangement of a plurality of fluid connections not only allows the velocity differences transverse to the main flow direction to be reduced, which makes it easier to achieve a uniform heat exchange of all battery cells, but also allows the locally high flow velocity normal to the inflow direction of the temperature-control fluid to be used immediately for cooling a battery cell mounted between the at least two fluid connections of an edge section. An arrangement of a battery cell between at least two fluid connections is understood to mean that the cross-section of the battery cell extending in the main flow direction is at least in sections at the level of the fluid connections in the main flow direction. In a particularly preferred embodiment of the temperature-control apparatus, the inflow direction of the fluid connections extends normal to the main flow direction in the longitudinal direction of, for example, cylindrical battery cells.

A more uniform distribution of the temperature-control fluid, particularly in the area directly adjacent to the fluid connections, is achieved by providing a flow guiding element between a fluid connection and two battery cells adjacent to the fluid connection, which has a convexly shaped flow guiding surface towards the fluid connection. This forms a flow resistance which limits the amount of temperature-control fluid flowing into the area behind the flow guiding element. If, as described above, two fluid connections adjoin a battery cell, it is advisable to provide a flow guiding element according to the invention between each of the fluid connections and the battery cell, so that the volume of temperature-control fluid flowing in through both fluid connections can be reduced in accordance with the battery cells with inflow from only one fluid connection.

To avoid turbulence in the inflow area, the fluid connections can have an oval, preferably elliptical, cross-section which is flattened in the main flow direction. This not only makes optimum use of the available space of the temperature-control apparatus, which is not available for battery cells, but also prevents a pressure drop in the main flow direction along the fluid connections.

BRIEF DESCRIPTION OF THE INVENTION

In the drawing, the subject matter of the invention is shown by way of example, wherein.

Figure 2:
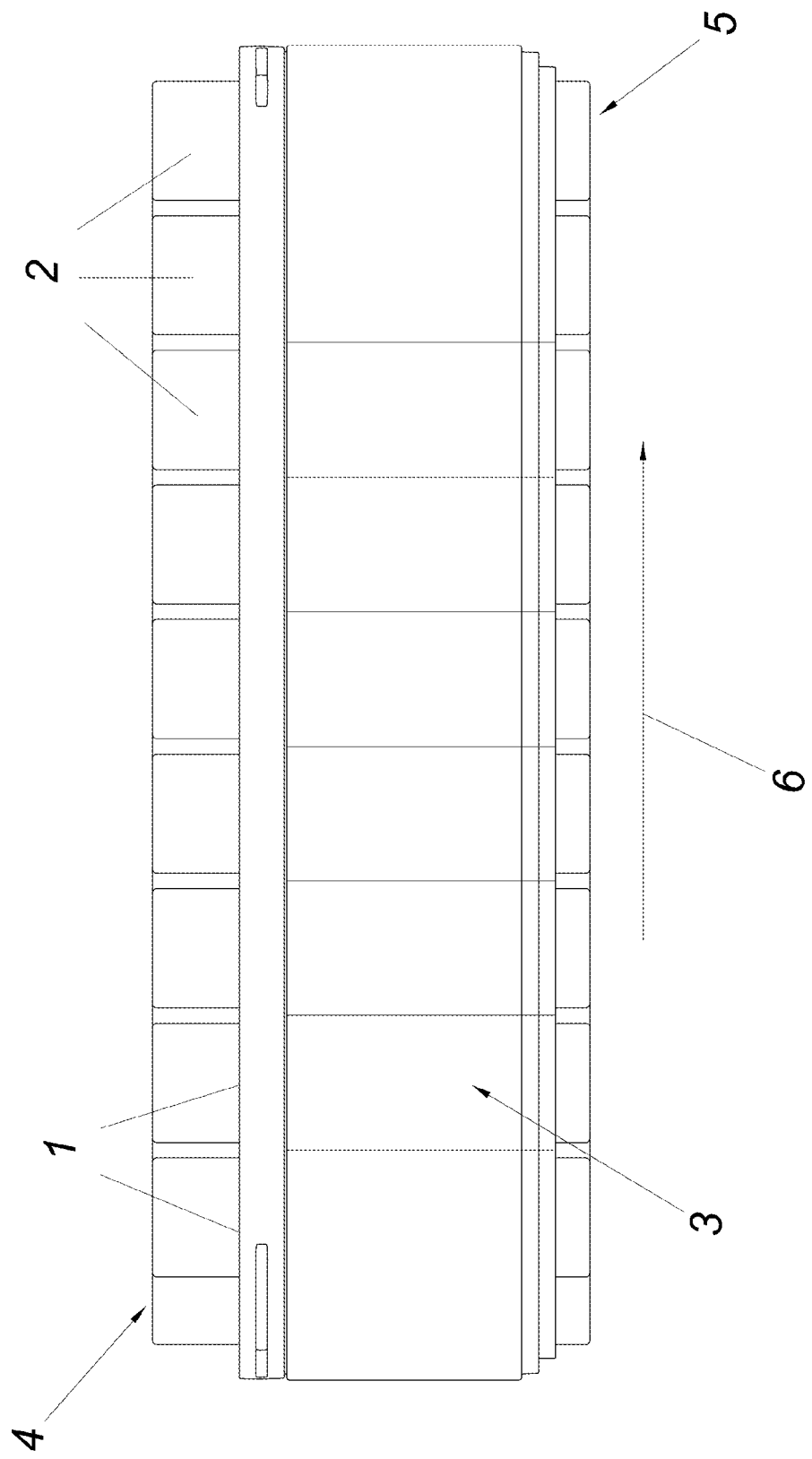
Figure 3:
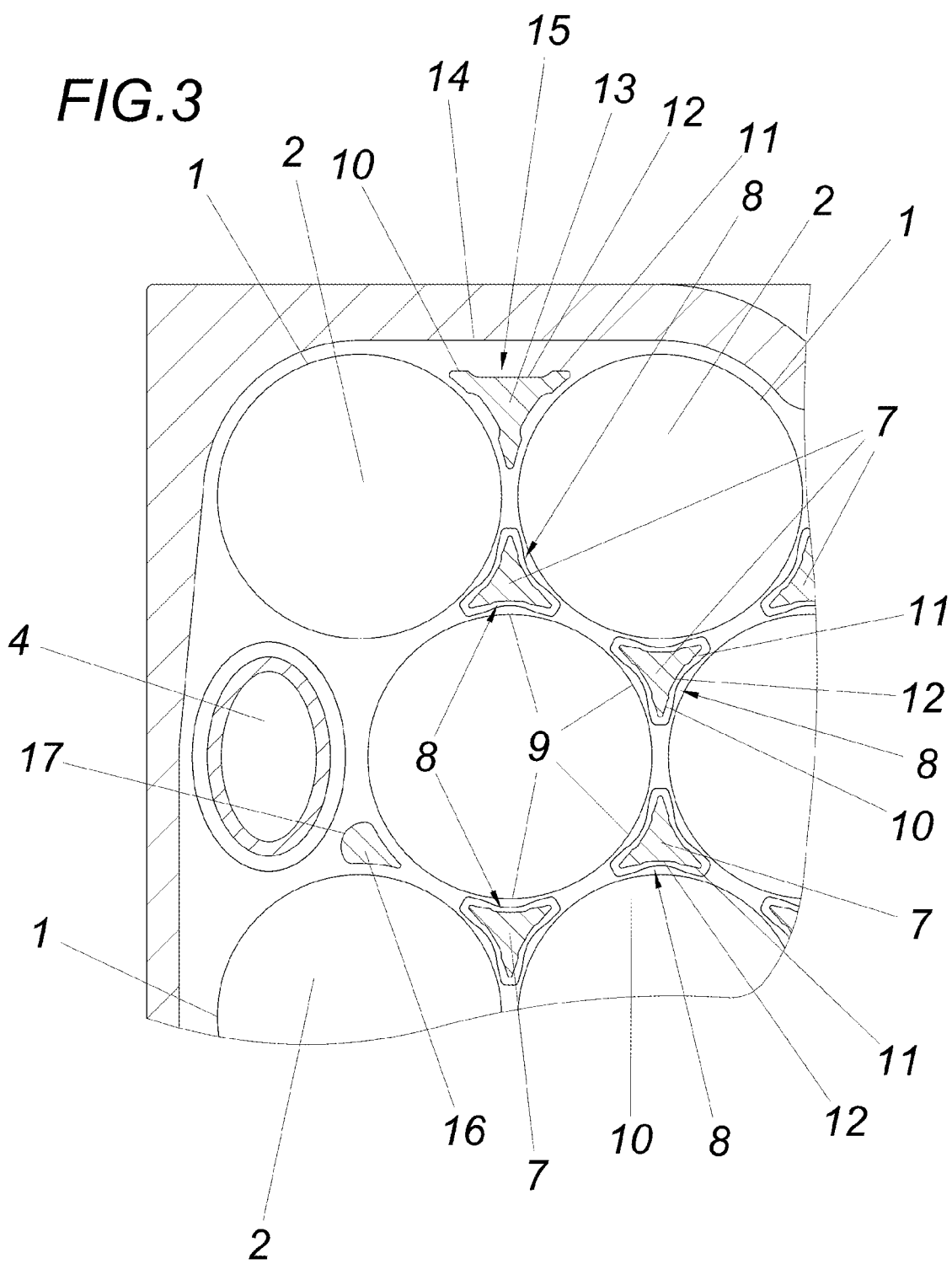

FIG. 1 shows a top view of a temperature-control apparatus according to the invention, FIG. 2 shows a side view of this temperature-control apparatus according to the invention and FIG. 3 shows a detail of FIG. 1 on a larger scale.

DETAILED DESCRIPTION OF THE PREFERRED EMBODIMENTS

A temperature-control apparatus according to the invention has openings 1 for accommodating battery cells 2 in a flow duct 3. This flow duct 3 has two fluid connections 4 on the inlet side and two fluid connections 5 on the outlet side, between which a main flow direction 6 is formed. Flow dividers 7 are arranged in the flow duct 3, which in a preferred embodiment extend transversely to the main flow direction 6 within the flow duct 3 from one opening 1 to an opening 1 opposite with respect to the flow duct 3.

As can be seen in particular from FIG. 3, at least one group of flow dividers 7 has flow guiding surfaces 8 which extend essentially parallel to a lateral section 9 of the battery cells 2. These flow guiding surfaces 8 have an inlet section 10, and an outlet section 11, respectively, which are both arranged at the same distance, i.e. normal distance, from the lateral section 9. Between the inlet section 10 and the outlet section 11 there is a diffuser section 12 whose distance from the lateral section 9 is 5 to 30% greater than the distance of this lateral section 9 from the inlet section 10 or the outlet section 11.

In the edge areas of the flow duct 3, there are further flow dividers 13 which form further flow guiding surfaces 15 extending essentially parallel to the inner wall 14 of the flow duct 3 and ensure the venting behavior of the flow duct 2 as well as optimized flow conditions in the edge areas.

Also, as shown in FIG. 3, the other flow guiding surfaces 15 may have an inlet section 10, an outlet section 11, and a diffuser section 12 located between them and set back from the inner wall 14.

The fluid connections 4, 5 on the opposite edge sections ensure more homogeneous flow conditions due to their arrangement when the temperature-control fluid enters the flow duct 3. The cross-section of these fluid connections 4, 5 is oval and flattened in the main flow direction 6. On the one hand, this makes optimum use of the available space and, on the other, minimizes turbulence in the inflow and outflow areas. In order to ensure uniform flow conditions even in the area immediately following the fluid connections 4, 5, flow guide elements 16 are provided, each of which has a flow guiding surface 17 convexly shaped towards the fluid connection 4, 5 as flow resistance and serves as a flow divider.

The invention claimed is:

1. A temperature-control apparatus comprising:
   individual battery cells that are combined to form a module and that are arranged within a flow duct through which a temperature-control fluid flows in a main flow direction;
   wherein a flow guiding surface is provided for each battery cell of a group of said battery cells;
   said flow guiding surfaces each being spaced laterally apart from a lateral section of the associated battery cell; and
   each of the flow guiding surfaces having a respective inlet section and a respective outlet section, wherein the inlet section and the outlet section are both spaced laterally from the associated lateral section and each face substantially normally toward a respective surface portion of the associated lateral section, and
   a respective diffuser section that is arranged between the inlet section and the outlet section, said diffuser section being set back away from the associated lateral section with respect to the inlet section and the outlet section.

2. The temperature-control apparatus according to claim 1, wherein a distance between the lateral section and the diffuser section is 5 to 30% greater than a distance between the lateral section and the inlet section or the outlet section.

3. The temperature-control apparatus according to claim 1, wherein the flow guiding surfaces of adjacent battery cells form a flow divider.

4. The temperature-control apparatus according to claim 3, wherein a group of flow dividers forms a further flow guiding surface that extends substantially parallel to an inner wall of the flow duct.

5. The temperature-control apparatus according to claim 1, wherein the flow duct has at least two fluid connections on each of two edge sections opposite one another in the main flow direction, wherein at least one of said battery cells is arranged between the at least two fluid connections of one of the edge sections.

6. The temperature-control apparatus according to claim 5, wherein between one of the fluid connections and two of the battery cells adjacent to the fluid connection a flow guiding element is provided that has a flow guiding surface convexly shaped towards the fluid connection.

7. A temperature-control apparatus comprising:
   individual battery cells that are combined to form a module and that are arranged within a flow duct through which a temperature-control fluid flows in a main flow direction;
   wherein a flow guiding surface is provided for each battery cell of a group of said battery cells, said flow guiding surfaces each being spaced apart from a lateral section of the associated battery cell and each having an inlet section and an outlet section that are both substantially parallel to the lateral section, and wherein a diffuser section is arranged between the inlet section and the outlet section, said diffuser section being set back with respect to the inlet section and the outlet section and with respect to the lateral section;

wherein the flow duct has at least two fluid connections on each of two edge sections opposite one another in the main flow direction, wherein at least one of said battery cells is arranged between the at least two fluid connections of one of the edge sections; and wherein the fluid connections have an oval cross-section that is flattened in the main flow direction.

8. The temperature-control apparatus according to claim 2, wherein the flow guiding surfaces of adjacent battery cells form a flow divider.

9. The temperature-control apparatus according to claim 8, wherein a group of flow dividers forms a further flow guiding surface that extends substantially parallel to an inner wall of the flow duct.

10. The temperature-control apparatus according to claim 2, wherein the flow duct has at least two fluid connections on each of two edge sections opposite one another in the main flow direction, wherein at least one of said battery cells is arranged between the at least two fluid connections of one of the edge sections.

11. The temperature-control apparatus according to claim 3, wherein the flow duct has at least two fluid connections on each of two edge sections opposite one another in the main flow direction, wherein at least one of said battery cells is arranged between the at least two fluid connections of one of the edge sections.

12. The temperature-control apparatus according to claim 4, wherein the flow duct has at least two fluid connections on each of two edge sections opposite one another in the main flow direction, wherein at least one of said battery cells is arranged between the at least two fluid connections of one of the edge sections.

13. The temperature-control apparatus according to claim 8, wherein the flow duct has at least two fluid connections on each of two edge sections opposite one another in the main flow direction, wherein at least one of said battery cells is arranged between the at least two fluid connections of one of the edge sections.

14. The temperature-control apparatus according to claim 9, wherein the flow duct has at least two fluid connections on each of two edge sections opposite one another in the main flow direction, wherein at least one of said battery cells is arranged between the at least two fluid connections of one of the edge sections.

15. The temperature-control apparatus according to claim 10, wherein between one of the fluid connections and two of the battery cells adjacent to the fluid connection a flow guiding element is provided that has a flow guiding surface convexly shaped towards the fluid connection.

16. The temperature-control apparatus according to claim 11, wherein between one of the fluid connections and two of the battery cells adjacent to the fluid connection a flow guiding element is provided that has a flow guiding surface convexly shaped towards the fluid connection.

17. The temperature-control apparatus according to claim 12, wherein between one of the fluid connections and two of the battery cells adjacent to the fluid connection a flow guiding element is provided that has a flow guiding surface convexly shaped towards the fluid connection.

18. The temperature-control apparatus according to claim 13, wherein between one of the fluid connections and two of the battery cells adjacent to the fluid connection a flow guiding element is provided that has a flow guiding surface convexly shaped towards the fluid connection.

19. The temperature-control apparatus according to claim 14, wherein between one of the fluid connections and two of the battery cells adjacent to the fluid connection a flow guiding element is provided that has a flow guiding surface convexly shaped towards the fluid connection.

20. The temperature-control apparatus according to claim 7, wherein between one of the fluid connections and two of the battery cells adjacent to the fluid connection a flow guiding element is provided that has a flow guiding surface convexly shaped towards the fluid connection.

21. The temperature-control apparatus according to claim 1, wherein three of the battery cells are grouped together in a circular pack of three, and three of the flow guiding surfaces that are associated therewith together form a flow divider between the three of the battery cells, said flow divider being formed by no more than three of the flow guiding surfaces.

* * * * *